US008291617B2

(12) United States Patent
Halberstadt et al.

(10) Patent No.: US 8,291,617 B2
(45) Date of Patent: Oct. 23, 2012

(54) CUSHIONED ATHLETIC CLEATED SHOES

(75) Inventors: John Philip Halberstadt, Broomfield, CO (US); Stanley Hockerson, Albuquerque, NM (US)

(73) Assignee: Heart and Sole USA, LLC, Broomfield, CO (US)

( * ) Notice: Subject to any disclaimer, the term of this patent is extended or adjusted under 35 U.S.C. 154(b) by 1072 days.

(21) Appl. No.: 12/072,422

(22) Filed: Feb. 26, 2008

(65) Prior Publication Data
US 2008/0201981 A1   Aug. 28, 2008

Related U.S. Application Data

(60) Provisional application No. 60/904,028, filed on Feb. 28, 2007.

(51) Int. Cl.
*A43B 5/02* (2006.01)
*A43C 15/16* (2006.01)

(52) U.S. Cl. .................. 36/59 R; 36/98; 36/128

(58) Field of Classification Search .......... 36/59 R, 36/98, 128, 67 A, 67 R, 126
See application file for complete search history.

(56) References Cited

U.S. PATENT DOCUMENTS

| 3,352,033 A * | 11/1967 | Colley ........................ 36/11.5 |
| 3,566,427 A * | 3/1971 | Davis ............................ 441/76 |
| 3,768,183 A * | 10/1973 | Fessenden ................... 36/67 R |
| 4,151,661 A * | 5/1979 | Namba et al. ................ 36/30 R |
| 4,455,765 A * | 6/1984 | Sjosward .................... 36/30 R |
| 4,322,895 A | 8/1995 | Hockerson |
| 4,259,792 A | 8/1997 | Halberstadt |
| 5,678,327 A | 10/1997 | Halberstadt |
| 5,732,484 A * | 3/1998 | Grutza et al. .................. 36/127 |
| 5,784,808 A | 7/1998 | Hockerson |
| 5,979,083 A * | 11/1999 | Robinson et al. .............. 36/127 |
| 6,145,221 A | 11/2000 | Hockerson |
| 7,111,415 B2 | 9/2006 | Hockerson |
| 7,146,752 B2 * | 12/2006 | Pasternak et al. ............ 36/59 R |
| 2005/0262729 A1 * | 12/2005 | Manz et al. .................. 36/25 R |
| 2005/0262737 A1 * | 12/2005 | Vattes ......................... 36/59 R |
| 2005/0274044 A1 * | 12/2005 | Baek ............................ 36/59 R |
| 2006/0141234 A1 * | 6/2006 | Rearick et al. ............. 428/304.4 |
| 2007/0017124 A1 * | 1/2007 | Koo et al. .................... 36/59 R |

* cited by examiner

*Primary Examiner* — Ted Kavanaugh
(74) *Attorney, Agent, or Firm* — Garvey, Smith, Nehrbass & North, L.L.C.; Charles C. Garvey, Jr.; Seth M. Nehrbass

(57) ABSTRACT

A reinforcing elastic polymer, such as a urethane/rubber material, is selectively spray-applied over upper, midsole or outsole components of articles of footwear. Such a material sprayed over the toe area of baseball shoes, for example, that is subjected to increased wear during use, serves to improve the durability of that area. A cleated midsole constructed of a lightweight foamed material such as EVA, has an elastic polymer outsole layer selectively spray-applied over the outer surface of the cleated midsole to form a combination midsole/outsole that provides improved durability and traction, as well as superior shock absorption characteristics.

24 Claims, 3 Drawing Sheets

CUSHIONED ATHLETIC CLEATED SHOES

REFERENCE TO RELATED APPLICATION

This application is related to the subject matter of and claims the benefit of U.S. Provisional Patent Application Ser. No. 60/904,028 entitled SPRAY-FORMED REINFORCEMENT FOR FOOTWEAR filed on Feb. 28, 2007, by the same inventors.

BACKGROUND AND SUMMARY OF THE INVENTION

This invention relates generally to footwear and, more particularly, to an improved method of selectively strengthening the upper, midsole, insole, and outsole components of footwear.

Conventional shoe construction involves a number of molding steps. Those molding steps that involve the midsole and outsole components are typically quite expensive. Some molding can be done economically on the toe, heel, and lace pieces of the upper. Compression and injection molding techniques are most commonly employed in the athletic shoe industry.

Prior art attempts at strengthening the materials used in molding shoes have included additives for reducing slip resistance and increasing the durability of certain wear areas of outsoles. In addition, pieces of plastic or other material are sometimes glued to the midsole to strengthen compression areas and thereby protect against excessive pronation and to provide a foot bridge for the midfoot area.

It would be advantageous to provide an improved method for constructing shoes that minimizes the molding steps required to thereby reduce the cost of production. It would also be advantageous to provide an improved method for constructing shoes that selectively strengthens midsole, upper, and outsole components, and that increases the durability or resistance to wear of selected areas of those components.

In accordance with the illustrated preferred embodiments of the present invention, a sprayed material forms the entire outsole or is simply applied over one or more selected areas of a conventional molded outsole to increase the durability of those areas of the outsole. In addition, the sprayed material may be selectively applied to midsoles, uppers, and outsoles for purposes of reinforcement.

Cleated footwear used in soccer, football, and rugby traditionally have outsoles made from firm, high-density plastic, urethane or nylon materials. The present invention permits manufacturing such cleated footwear using lightweight foamed materials such as ethylene-vinyl acetate (EVA) foam or blown rubber, for example, to produce a midsole having a plurality of cleats formed on the bottom or outer surface thereof. In accordance with one aspect of the present invention, a coating of an elastic polymer, such as a urethane/rubber or polyurethane-containing material, is sprayed at an appropriate consistency and in appropriate thicknesses over the outer surface of the molded cleated midsole to form an outsole layer that provides desired durability, torsional stability, flexibility, and cushion characteristics. If cleated outsoles were to be constructed of soft foamed materials alone, they would be light weight and would exhibit superior shock absorption and flexibility characteristics, but would be seriously lacking in durability, stability, and traction. However, the addition of an elastomeric outer coating, selectively spray-applied, in accordance with the present invention, would overcome the negatives, while retaining the significant advantages of such construction.

DESCRIPTION OF THE PREFERRED EMBODIMENTS

Figure 1:
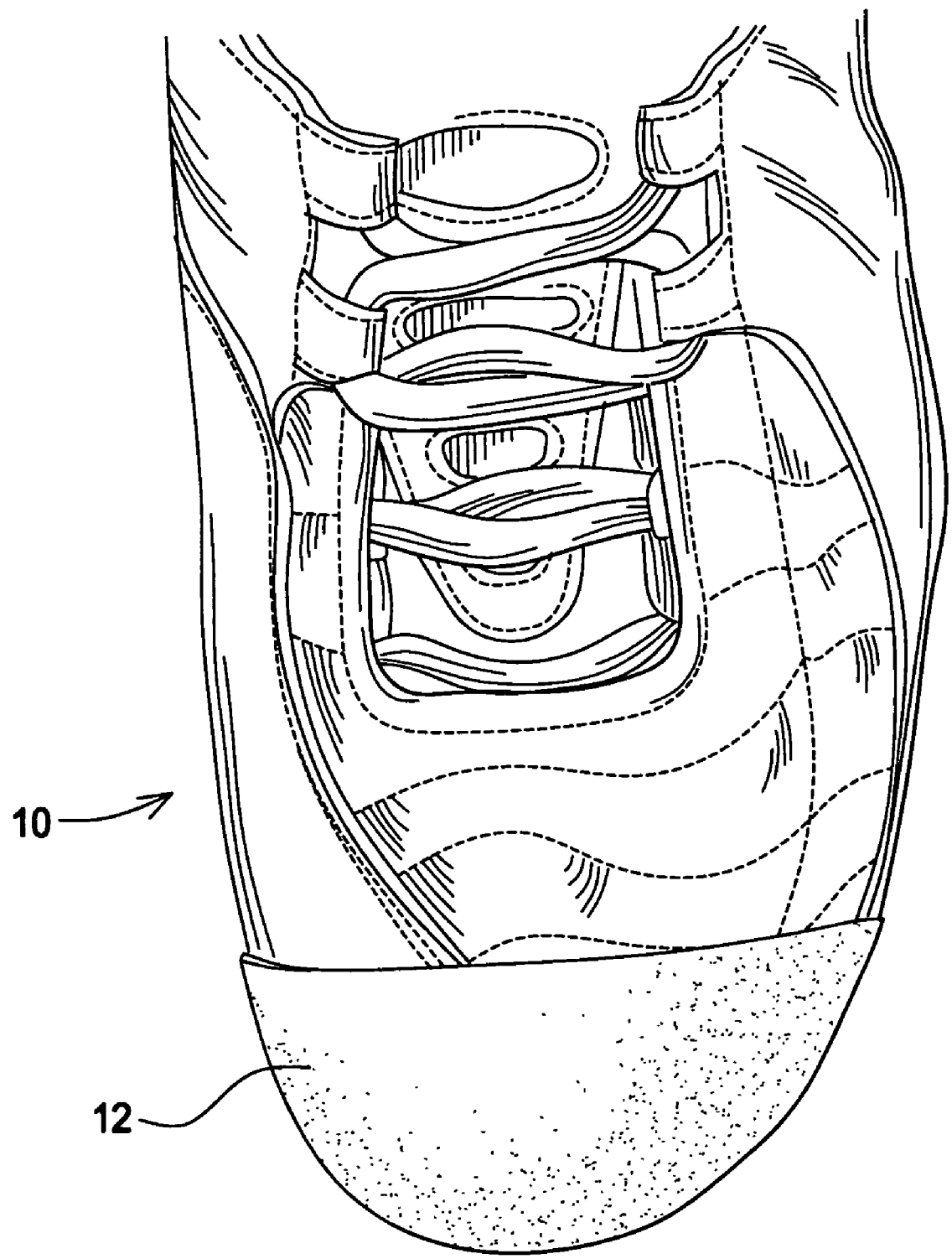
FIG. 1 is a pictorial diagram of a typical baseball shoe illustrating a polyurethane-containing material or similar elastomer spray-applied to the toe area of the shoe upper to provide increased resistance to wear in that area.

Referring now to FIG. 1, there is shown a typical baseball shoe 10 having an upper conventionally formed of a suitable material such as nylon, leather, or synthetic leather. In accordance with the present invention, a coating of a material 12 is sprayed over the toe region of shoe 10. Material 12 may be of the polyurethane-containing type used to line truck beds and may be applied with conventional machines used by companies such as Rhino Linings USA and LINE-X.

Figure 2:
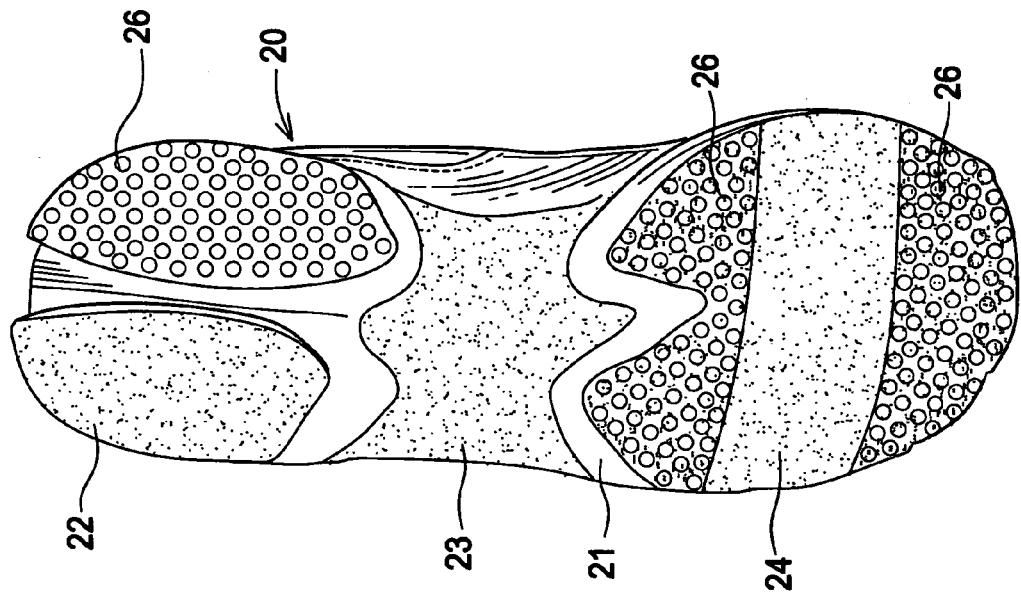
FIG. 2 is a bottom plan view of a molded midsole/outsole of an athletic shoe showing a molded tread pattern in certain areas, the illustrated surface of the molded midsole/outsole being recessed in certain other wear areas.
Figure 3:
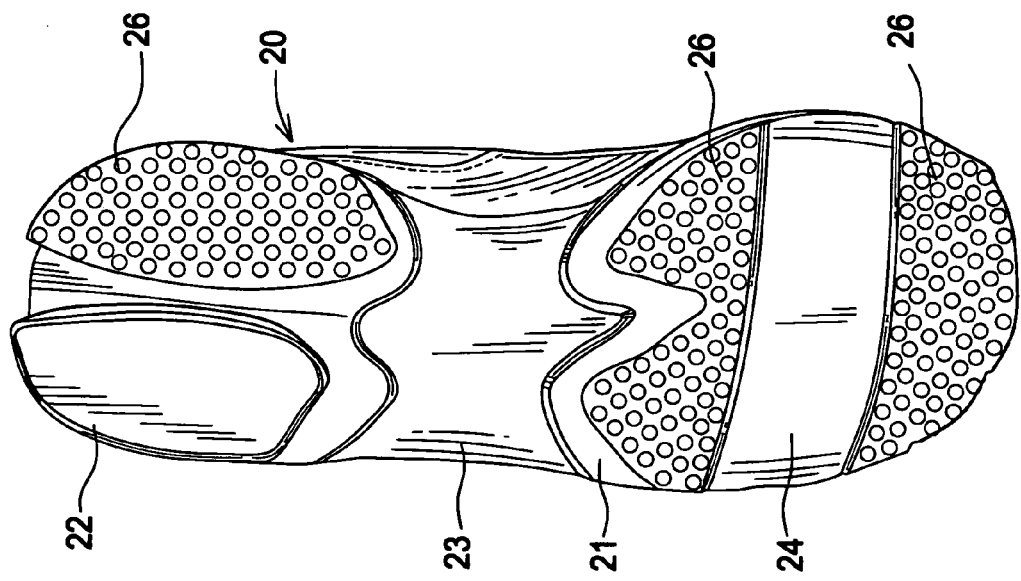
FIG. 3 is a bottom plan view of the molded midsole/outsole of FIG. 2 illustrating a reinforcing material sprayed over the recessed wear areas thereof and over the arch area, for the purpose of bracing and reinforcement of the arch area, in accordance with one aspect of the present invention.

Referring now to FIG. 2, there is shown a bottom plan view of an athletic shoe 20 having a molded midsole/outsole 21 with a tread pattern molded in wear areas 26 and having other wear areas 22, 24 recessed below the tread surface of areas 26. A strengthening material, such as a polyurethane elastomer, is spray-applied, in accordance with the present invention, over areas 22, 23, 24 of midsole/outsole 21, as illustrated in FIG. 3. The strengthening material spray-applied over arch area 23 of midsole/outsole 21 forms an arch bridge which provides increased support and torsional stability.

Figure 4:
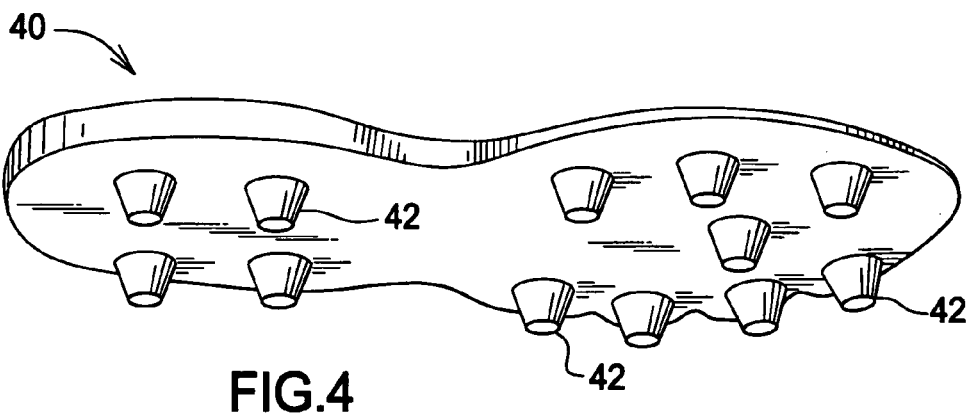
FIG. 4 is a bottom pictorial illustration of a cleated midsole of an athletic shoe, constructed of an EVA or similar foam material, in accordance with the present invention.
Figure 5:
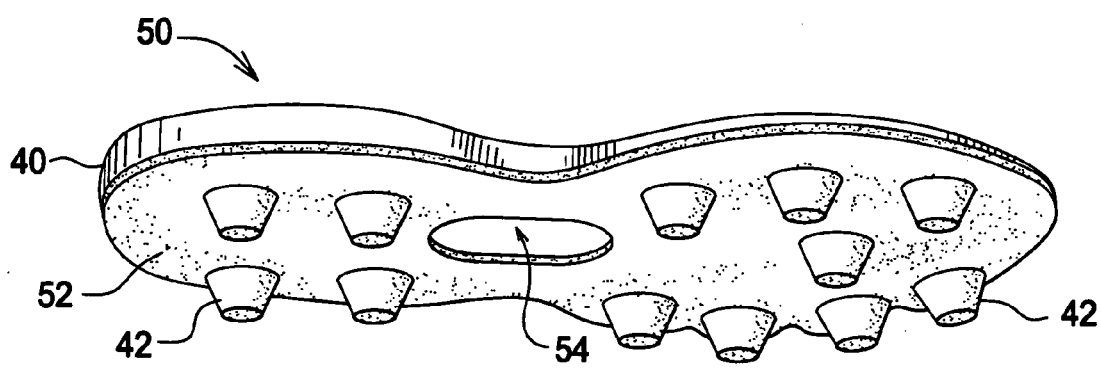
FIG. 5 is a bottom pictorial illustration of the cleated midsole of FIG. 4 having a polyurethane-containing material or similar elastomer sprayed over the cleated bottom surface thereof to form a combination midsole/outsole.
Figure 6:
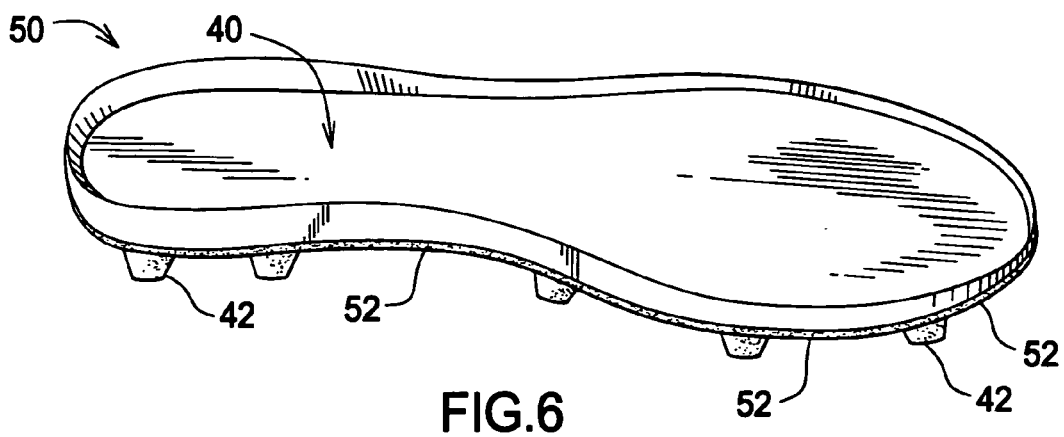
FIG. 6 is a top pictorial illustration of the combination midsole/outsole of FIG. 5.

Referring now to FIG. 4, there is shown a molded midsole 40 that may be employed in a cleated athletic shoe. Midsole 40 may be conventionally molded of an ethylene-vinyl acetate (EVA) or similar foam material to include a plurality of cleats 42 formed on the bottom surface thereof. In accordance with the present invention, and as illustrated in FIGS. 5 and 6, a polyurethane-containing material or similar elastomer is sprayed over the bottom surface of the molded midsole 40 to form a midsole/outsole combination 50 that includes both midsole 40 and a sprayed outsole layer 52 of the chosen elastomer. One or more apertures 54 may be formed in sprayed outsole layer 52 by masking the aperture area 54 when spraying the elastomer. The one or more aperture areas 54 serve to reduce the overall weight of the shoe and to expose for view a logo or other design molded in the bottom surface of midsole 40.

As seen in FIGS. 4-6, cleats 42 are generally frusto-conically shaped.

We claim:

1. A cushioned cleated athletic shoe for use in soccer, football, baseball or rugby, comprising:
   a) an upper component;
   b) a molded midsole component attached to said upper component, said midsole component being of a soft lightweight foam material and having an outsole configuration that includes a laterally extending outsole surface and multiple generally frusto-conically shaped athletic cleats extending downwardly, and an outsole periphery; and
   c) a reinforcing material that is applied over said outsole surface of said midsole component including said athletic cleats and communicating with said periphery of said midsole component, the reinforcing material forming one or more outsole layers that are of a hard material that is harder than said soft lightweight foam material, the soft lightweight foam material of the cleats providing shock absorption and flexibility.

2. A cleated athletic shoe as in claim 1, wherein said reinforcing material comprises an elastic polymer.

3. A cleated athletic shoe for use in soccer, football, baseball or rugby as in claim 2, wherein said elastic polymer comprises a urethane/rubber material.

4. A cushioned cleated athletic shoe for use in soccer, football, baseball or rugby, comprising:
   a) an upper component;
   b) a midsole component of a first soft lightweight foam material attached to said upper component, said midsole component having a periphery and including multiple generally frusto-conically shaped athletic cleats spaced inwardly of said periphery;
   c) an outsole component that is attached to said midsole component including said athletic cleats; and
   d) wherein said outsole component defines a second material that is a reinforcing material attached to one or more selected areas of said outsole component, said areas including at least one area that extends to at least a part of said periphery; and
   e) wherein the second material is harder than said first soft lightweight foam material, the soft lightweight foam material of the cleats providing shock absorption and flexibility.

5. A cleated athletic shoe for use in soccer, football, baseball or rugby as in claim 4, wherein said reinforcing material is additionally connected to one or more selected areas of said upper component.

6. A cleated athletic shoe for use in soccer, football, baseball or rugby as in claim 4, wherein said reinforcing material comprises an elastic polymer.

7. A cleated athletic shoe for use in soccer, football, baseball or rugby as in claim 4, wherein said reinforcing material is a spray applied material that at least partially covers a heel area of said midsole component.

8. A cleated athletic shoe for use in soccer, football, baseball or rugby as in claim 4, wherein said reinforcing material is a spray applied material that at least partially covers at least two spaced apart areas of said midsole component including at least heel and toe areas.

9. A cushioned cleated athletic shoe for use in soccer, football, baseball or rugby comprising:
   a) an upper component;
   b) a midsole component attached to said upper component, said midsole component having a periphery, an outer surface, a plurality of generally frusto-conically shaped cleats spaced inwardly of the periphery, and said midsole component being of a first soft lightweight foam material;
   c) an outsole component on the outer surface of the midsole component including said plurality of cleats and extending to said periphery; and
   d) said outsole component defining a reinforcing material that is harder than the first soft lightweight foam material of said midsole component, said outsole component applied to said outer surface of said midsole component including said plurality of cleats, the soft lightweight foam material of the cleats providing shock absorption and flexibility.

10. A cleated athletic shoe for use in soccer, football, baseball or rugby as in claim 9, wherein said reinforcing material is sprayed over one or more areas of said midsole component.

11. A cleated athletic shoe for use in soccer, football, baseball or rugby as in claim 9, wherein said reinforcing material is a spray applied material that at least partially covers a heel area of said midsole component.

12. A cleated athletic shoe for use in soccer, football, baseball or rugby as in claim 9, wherein said reinforcing material is a spray applied material that at least partially covers at least two spaced apart areas of said midsole component including at least heel and toe areas.

13. A cleated athletic shoe for use in soccer, football, baseball or rugby as in claim 9, wherein said midsole component comprises a molded foam material.

14. A cleated athletic shoe for use in soccer, football, baseball or rugby as in claim 13, wherein said molded foam material comprises ethylene-vinyl acetate.

15. A cleated athletic shoe for use in soccer, football, baseball or rugby as in claim 9, wherein said reinforcing material comprises an elastic polymer.

16. A cleated athletic shoe for use in soccer, football, baseball or rugby as in claim 1, further comprising one or more apertures formed in said outsole layer.

17. A cushioned cleated athletic shoe for use in soccer, football, baseball or rugby comprising:
   a) an upper component;
   b) a midsole component attached to said upper component, said midsole component having a periphery and being of a soft lightweight foam material and including a plurality of generally frusto-conically shaped cleats, and
   c) a reinforcing material selectively applied over all or part of the outer surface of said midsole component to form an outsole layer; and
   d) wherein said reinforcing material extends over multiple of said cleats and to at least a part of said periphery, the reinforcing material being harder than the soft lightweight foam material of the cleats, and the soft lightweight foam material of the cleats providing shock absorption and flexibility.

18. A cleated athletic shoe for use in soccer, football, baseball or rugby as in claim 17, further comprising a reinforcing material applied over a toe area of said midsole.

19. A cleated athletic shoe for use in soccer, football, baseball or rugby as in claim 18, wherein said reinforcing material comprises an elastic polymer.

20. A cleated athletic shoe for use in soccer, football, baseball or rugby as in claim 17, wherein said reinforcing material comprises an elastic polymer.

21. A cleated athletic shoe for use in soccer, football, baseball or rugby as in claim 17, wherein said reinforcing material is a spray applied material that at least partially covers at least two spaced apart areas of said midsole component including at least heel and toe areas.

22. A cleated athletic shoe for use in soccer, football, baseball or rugby as in claim 17, wherein said reinforcing material is a spray applied material that at least partially covers a heel area of said midsole component.

23. A cleated athletic shoe for use in soccer, football, baseball or rugby as in claim 1, wherein said reinforcing material is a spray applied material that at least partially covers a heel area of said midsole component.

24. A cleated athletic shoe for use in soccer, football, baseball or rugby as in claim 1, wherein said reinforcing material is a spray applied material that at least partially covers at least two spaced apart areas of said midsole component including at least heel and toe areas.

* * * * *